(12) United States Patent
Wobben

(10) Patent No.: US 7,722,328 B2
(45) Date of Patent: May 25, 2010

(54) ROTOR BLADE CONNECTION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 790 days.

(21) Appl. No.: 10/558,504

(22) PCT Filed: May 14, 2004

(86) PCT No.: PCT/EP2004/005166

§ 371 (c)(1),
(2), (4) Date: Oct. 25, 2006

(87) PCT Pub. No.: WO2004/106732

PCT Pub. Date: Dec. 9, 2004

(65) Prior Publication Data

US 2007/0122283 A1 May 31, 2007

(30) Foreign Application Priority Data

May 28, 2003 (DE) ................. 103 24 166

(51) Int. Cl.
*F03D 11/00* (2006.01)
(52) U.S. Cl. .................. 416/204 R; 416/248
(58) Field of Classification Search ............ 416/204 R, 416/248; 403/264, 407.1; 411/104, 108, 411/109
See application file for complete search history.

(56) References Cited

U.S. PATENT DOCUMENTS 4,412,784 A * 11/1983 Wackerle et al. ............ 416/230

(Continued)

FOREIGN PATENT DOCUMENTS

DE  197 11 869 A1  9/1998

(Continued)

OTHER PUBLICATIONS

Hau Erich Ed., "Windkraftanlagen," Grundlagen, Technik, Einsatz, Wirtschaftlichkeit, Berlin, DE, 1996, pp. 186-213. XP002143305.

(Continued)

*Primary Examiner*—Ninh H Nguyen
(74) *Attorney, Agent, or Firm*—Seed Intellectual Property Law Group PLLC

(57) ABSTRACT

A rotor blade for a wind power installation comprises a plurality of holes which are arranged in the region of the rotor blade root and which are in the form of through holes which extend substantially transversely with respect to the longitudinal axis of the rotor blade. Transverse pins are fitted into the holes. The tension elements are connected to the transverse pins. In that arrangement the tension elements in the state of the art extend within the rotor blade root and thus weaken the material in that region. In order to eliminate those disadvantages by means of a structural simplification, the rotor blade according to the invention is characterized by tension elements extending outside the rotor blade root. In that respect the invention is based on the realization that in that way the region of the rotor blade root at the hub is admittedly altered in an aerodynamically disadvantageous fashion, but that does not have any detrimental influence on the acoustic characteristics and the other properties of the installation because that region of the rotor blade is either covered by the spinner or is disposed at least in the part of the rotor, which rotates most slowly.

17 Claims, 4 Drawing Sheets

U.S. PATENT DOCUMENTS

| | | | | |
|---|---|---|---|---|
| 4,755,106 A | | 7/1988 | Coffy | 416/134 A |
| 4,861,207 A | * | 8/1989 | Do | 411/104 |
| 5,171,099 A | * | 12/1992 | Westre | 403/264 |
| 6,371,730 B1 | * | 4/2002 | Wobben | 416/244 R |
| 6,663,314 B2 | * | 12/2003 | Bequet | 403/408.1 |

FOREIGN PATENT DOCUMENTS

WO    WO 01/42647 A2    6/2001

OTHER PUBLICATIONS

Hau, Erich, *Windkraftanlagen*, Springer-Verlag, 1988.

\* cited by examiner

ROTOR BLADE CONNECTION

BACKGROUND OF THE INVENTION

1. Field of the Invention

The present invention concerns a rotor blade for a wind power installation comprising a plurality of holes which are arranged in the region of the rotor blade root and which are in the form of through holes which extend substantially transversely with respect to the longitudinal axis of the rotor blade, transverse pins which are fitted into the holes and tension elements which can be connected to the transverse pins.

2. Description of the Related Art

DE 197 33 372 C1 discloses a rotor blade with holes which are arranged in the region of the rotor blade root and which extend substantially transversely with respect to the longitudinal axis of the rotor blade, transverse pins which are fitted into the holes and tension elements which can be connected to the transverse pins. Those holes are in the form of blind holes.

The book 'Windkraftanlagen' by Erich Hau, 2nd edition, Springer-Verlag, 1996, page 202, which is deemed to be the most relevant state of the art, discloses a rotor blade of the kind set forth in the opening part of this specification. In that known rotor blade a tension element (referred to therein as a tension anchor) extends from the transverse pin to a flange. In that way the rotor blade can be fixed to the flange, for example of the rotor hub.

The state of the art discloses tension elements extending within the rotor blade root. Accordingly, passages have to be present in the material of the rotor blade root, into which the tension elements are fitted. In consideration of the material weakening that this entails, the material in the region of the rotor blade root has to be reinforced by suitable structural measures so as to ensure the required strength.

BRIEF SUMMARY OF THE INVENTION

The rotor blade according to the invention is characterized by tension elements extending outside the rotor blade root.

In that respect the invention is based on the realization that in that way the region of the rotor blade root at the hub is admittedly altered in an aerodynamically disadvantageous fashion, but that does not have any detrimental influence on the acoustic characteristics and the other properties of the installation because that region of the rotor blade is either covered by the spinner or is disposed at least in the part of the rotor, which rotates most slowly.

The rotor blade according to the invention involves the advantage that on the one hand the material of the rotor blade in the region of the rotor blade root is not weakened by passages and that the tension elements can be subjected to visual checking at any time without dismantling being required for that purpose. Accordingly for example incipient corrosion can be immediately detected and eliminated.

In addition, replacement of a tension element is easily possible.

Particularly when using fiber-reinforced epoxy resin composite material as a light and at the same time robust material for rotor blades, it is possible to provide for durable anchoring of the transverse pins in the rotor blade root. In that respect the arrangement affords an advantageous transmission of force from a transverse pin into the epoxy resin composite material of the rotor blade.

Desirably there are provided a plurality of spaced holes for receiving a plurality of transverse pins in the rotor blade as in that way the strength of the rotor blade connection can be substantially increased, which is necessary in particular in the case of very large wind power installations. The holes can be so spaced that the material is only insignificantly weakened by the holes.

A particularly preferred embodiment of the invention is one in which the rotor blade is of an enlarged cross-section in the region of the rotor blade root and the hole or the holes is/are arranged in the region of that enlarged cross-section. That measure can also substantially increase the load-bearing capability of the connection between the rotor blade and the rotor hub as the rotor blade is subjected to substantially lower levels of stress due to the cross-sectional enlargement in the region of the rotor blade root and can thus be acted upon by higher forces. The arrangement according to the invention of the holes in the region of the enlarged cross-section permits an advantageous transmission of force from the transverse pin to the material of the rotor blade by way of a correspondingly enlarged surface area while a substantially lower pressure in relation to surface area occurs at the interface between the transverse pin and the inside surface of the opening. In that case the cross-sectional enlargement can be of a markedly smaller extent than in the case of a known rotor blade as there is no need to compensate for the bores for tension elements which extend within the rotor blade.

In accordance with a particularly preferred embodiment of the invention the cross-section of the rotor blade enlarges on both sides in the direction of an end portion, towards the hub, of the rotor blade. That provides for a symmetrical transmission of force from the transverse pins to the rotor blade.

In accordance with a preferred development of this embodiment the rotor blade has two oppositely disposed thickening portions which are respectively formed in one piece with the rotor blade and the holes are arranged at least partly in the region of the thickening portions. The thickening portions which contribute to the cross-sectional enlargement can be formed in a simple known manner by lamination on to the rotor blade of a plurality of layers of fiber composite material and epoxy resin.

In addition a particularly preferred embodiment is one in which the rotor blade in the region of the rotor blade root has a substantially tubular end portion in which a plurality of holes are provided. A tubular end portion can be fixed to the rotor hub in a particularly uniform and simple manner and is advantageous in particular in the case of very large wind power installations in respect of which extreme forces occur and the rotor blades of which involve a transition from the tubular end portion for fixing purposes to a wing profile portion.

An embodiment in which the rotor blade substantially comprises a glass fiber-reinforced epoxy resin composite material provides that the material is of great lightness, combined with a high level of strength.

In order to provide for better load transmission the transverse pins are preferably glued into the hole. In addition there is the advantage that the transverse pins can be reliably held in the predetermined position, including while the tension elements are installed.

In a particularly preferred feature metal discs can be provided concentrically around the longitudinal axis of the hole (or the transverse pin) at at least one but preferably both ends of the hole. Those discs which in shape are comparable to known support washers are fitted flush with the surface of the rotor blade root in the region of the hole and prevent damage to the edge of the hole.

In a further preferred embodiment a sleeve is fitted into or glued into the hole. That sleeve is of a metallic material and prevents friction from occurring between the wall of the hole and the transverse pin. Any friction which occurs takes place between the transverse pin and the sleeve.

The above-discussed advantages of a rotor blade according to the invention are enjoyed in a similar manner in a rotor for a wind power installation of the kind set forth in the opening part of this specification, which rotor is equipped with a rotor blade according to the invention. For the avoidance of repetition therefore reference is directed to the foregoing description in respect of the advantageous effects.

A preferred development of the rotor according to the invention is distinguished in that the rotor hub has a peripherally extending flange portion of substantially T-shaped cross-section for connection of the rotor blade and the rotor blade is screwed to the flange portion by means of a plurality of tension elements which are connected to transverse pins fitted to the rotor blade. The desirably symmetrical T-shaped flange portion can provide for the symmetrical transmission of forces from the rotor blade to the hub, insofar as through bores are provided in both free portions, which are disposed substantially in one plane, of the T-shaped flange portion, with the tension elements engaging through the through bores. Desirably the plurality of tension elements are arranged in paired mutually parallel relationship and substantially in two mutually concentrically disposed rows.

The advantages according to the invention are also embodied in a wind power installation equipped with a rotor and/or a rotor blade of the above-described kind; in regard to the advantages according to the invention which can be attained thereby, reference is made to the foregoing description in relation to a rotor blade and rotor according to the invention.

BRIEF DESCRIPTION OF THE SEVERAL VIEWS OF THE DRAWINGS

The invention is described hereinafter by means of an embodiment of a rotor of a wind power installation with reference to the accompanying drawings in which.

DETAILED DESCRIPTION OF THE INVENTION

Figure 1:
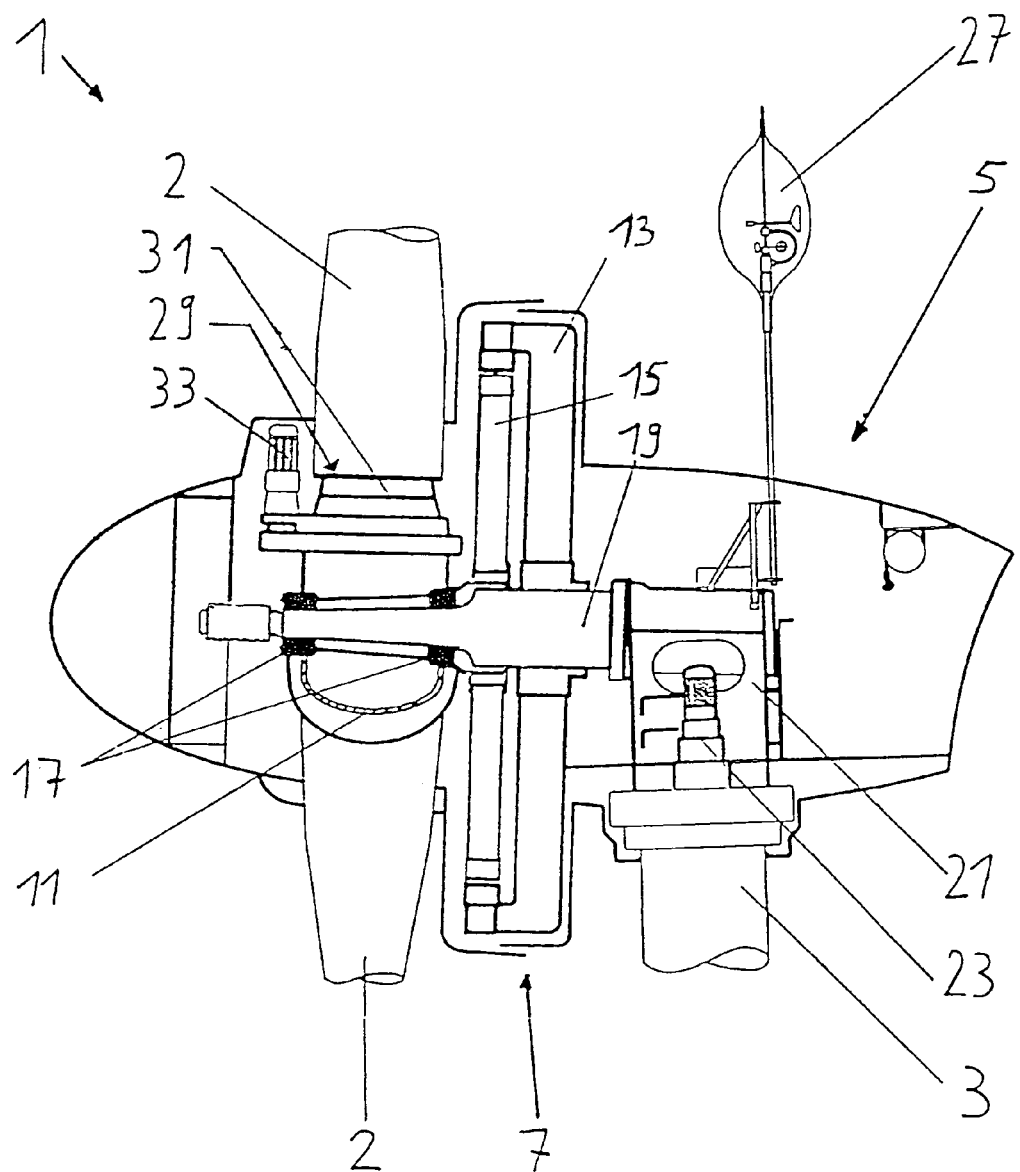
FIG. 1 shows a simplified illustration of a wind power installation according to the invention.

The wind power installation 1 shown in FIG. 1 substantially includes a pylon 3 and a pod 5 fixed thereto, for receiving a generator 7 and a rotor 9 connected directly thereto. The rotor 9 has a rotor hub 11 and three rotor blades 2 fixed to the rotor hub 11. The rotor hub 11 is caused to rotate by the wind forces acting on the rotor blade 2, to drive the generator 7.

The generator 7 which is in the form of a ring generator has a stator 13 and a generator rotor 15. The generator rotor 15 is supported together with the rotor hub 11 by means of main bearings 17 on a journal 19 fixedly connected to a so-called machine carrier 21. The machine carrier 21 is supported pivotably on the pylon 3 by means of a rotary mounting (not shown), by means of azimuth motors 23. A device 27 with anemometer and wind vane is also fixed to the machine carrier 21.

Figure 2:
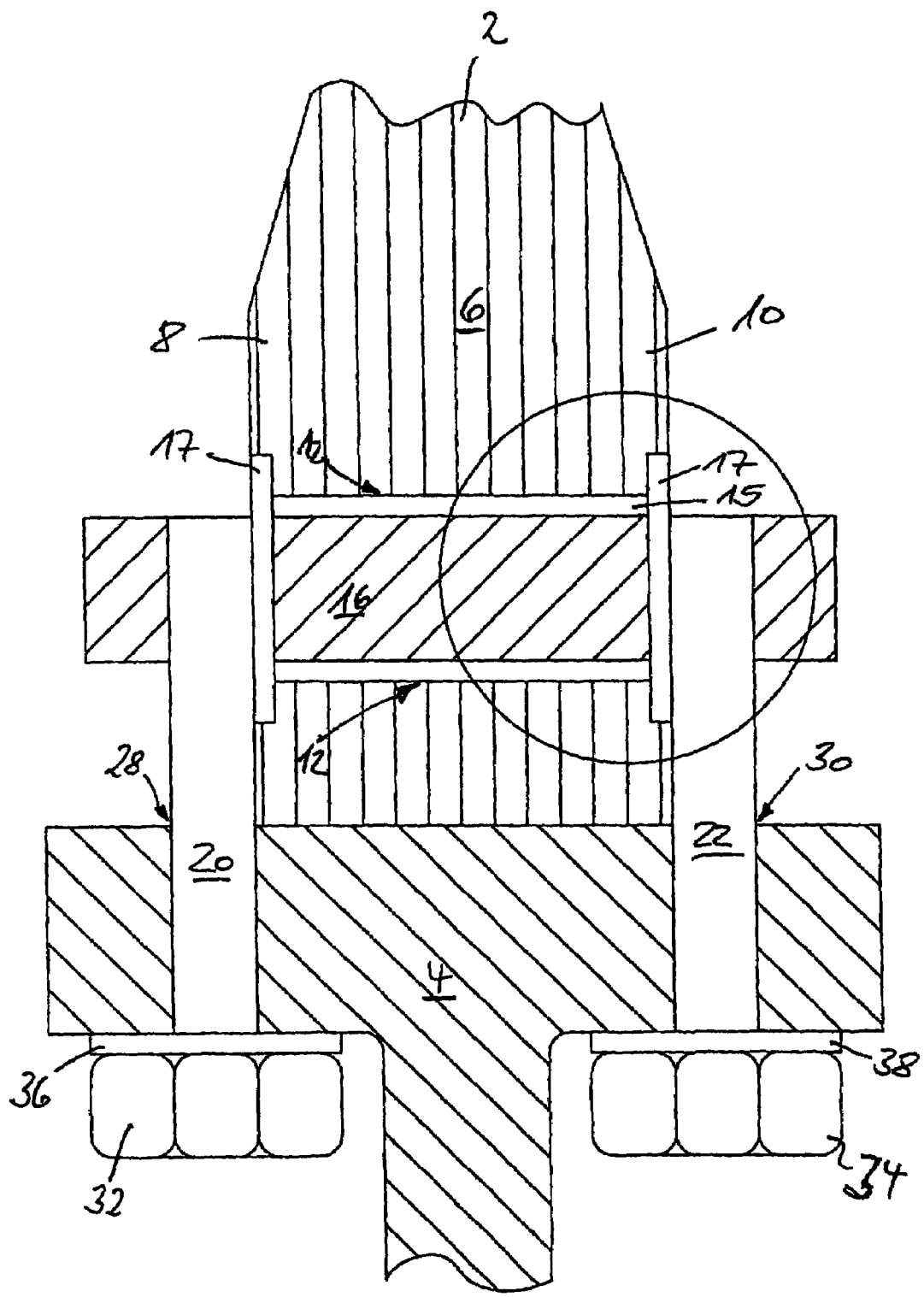
FIG. 2 shows a sectional view of the fixing according to the invention of a rotor blade to a rotor hub of a wind power installation.

FIG. 2 is a sectional view showing a portion, at the blade root end, of a rotor blade 2 of a wind power installation 1 which can be for example a so-called horizontal-axis wind power installation, as shown in FIG. 1.

The rotor blade 2 which is partly shown in FIG. 2 is of a lightweight structure comprising a glass fiber-reinforced epoxy resin composite material and is fixedly connected to the rotor hub 11 by means of a rotor blade connection 29 (FIG. 1) according to the invention, insofar as the rotor blade 2 is screwed to a peripherally extending flange 4 which is of T-shaped cross-section and which in turn is provided integrally with the rotor hub 11. The portion of the rotor blade 2 shown in FIG. 1—just like the flange 4—is of a peripherally extending and substantially tubular configuration and, with an increasing distance from the rotor blade 11, forms a transition into the aerodynamically active rotor blade profile (not shown). A blade adaptor 31 can be arranged between the rotor blade connection 29 and the rotor hub 11. The rotor blade 2 together with the blade connection 29 and the blade adaptor 31 can be turned about the longitudinal axis of the rotor blade 2 by means of a blade adjusting motor.

FIG. 2 shows the double-sided enlargement according to the invention of the cross-section of the rotor blade 2 in the region of the rotor blade root 6, that is to say, in the illustrated embodiment, the end region of the substantially tubular portion of the rotor blade which in the assembled condition bears against the flange 4 of the rotor hub 11. Formed at oppositely disposed lateral regions of the rotor blade root 6 are thickening portions 8, 10 which provide for an enlargement in the cross-section of the rotor blade 2 in a direction towards the end region of the rotor blade 2, in the region of the rotor blade root 6. The enlarged cross-section provides for a high level of strength there. The thickening portions 8, 10 can be produced integrally on the rotor blade root 6 for example by the application of additional epoxy resin and fiber layers.

Through holes 12 are provided in the region of the rotor blade root 6, distributed over the periphery of the rotor blade 6. Transverse pins 16 of metal are fitted into those holes 12, as anchorage elements, within the rotor blade 2.

The transverse pins 16 are of a length which goes beyond the thickness of the rotor blade root 6 and through holes are provided in the end regions thereof, outside the rotor blade root 6 and on both sides thereof. The through holes can have for example female screwthreads (not shown). They co-operate with tension elements 20, 22 in the form of cylindrical bolts of metal. Those tension elements 20, 22 can be provided with a male screwthread with which they are screwed into the corresponding female screwthread of the transverse pin 16.

The tension elements 20, 22 extend outside the rotor blade 2 on both sides of the rotor blade root through bores 28, 30 in the flange 4. The tension elements 20, 22 can be subjected to high levels of tensile force by means of a nut 32, 34 which can be screwed on to a (further) male screwthread of the tension elements 20, 22, with the interposition of a sleeve or a support washer 36, 38, and thus the rotor blade 2 can be pulled firmly against the flange 4 and thus the rotor hub 11 so that a firm connection is made between the rotor blade 2 and the rotor hub 11.

Figure 3:
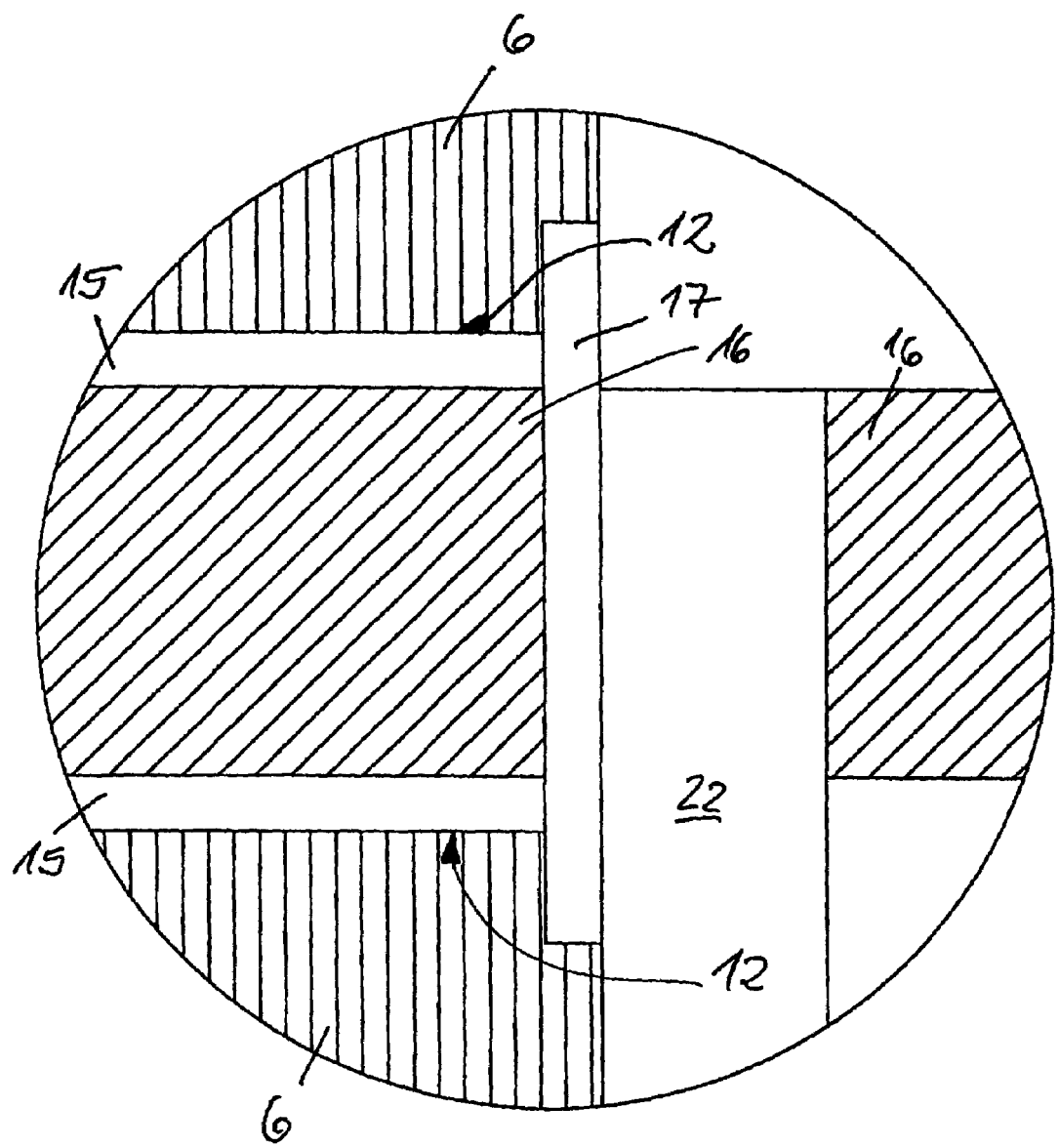
FIG. 3 shows a detail view from FIG. 2.

FIG. 3 is a view on an enlarged scale of a portion from FIG. 2. It can be particularly clearly seen how the sleeve 15 is disposed in the hole 12, the transverse pin is disposed in the sleeve 15 and a disc 17 is arranged around the transverse pin.

So that the tension elements 20, 22 extend as closely as possible to the surface of the root region 6 of the rotor blade 2 the discs 17 are arranged flush with the surface of the root region 6 of the rotor blade 2.

Just as the transverse pin 16 can be glued into the hole 12, the sleeve 15 can also be glued into the hole. In that way it is possible to avoid movements between the transverse pin 16 and the wall of the hole 12. They occur instead of that between the sleeve 15 and the transverse pin 16. Even if those movements can be only extremely slight (so-called micromovements) due to the transverse pin 16 being fixedly clamped by the tension elements 20, 22, the continuous loading can nonetheless otherwise give rise to damage.

Figure 4:
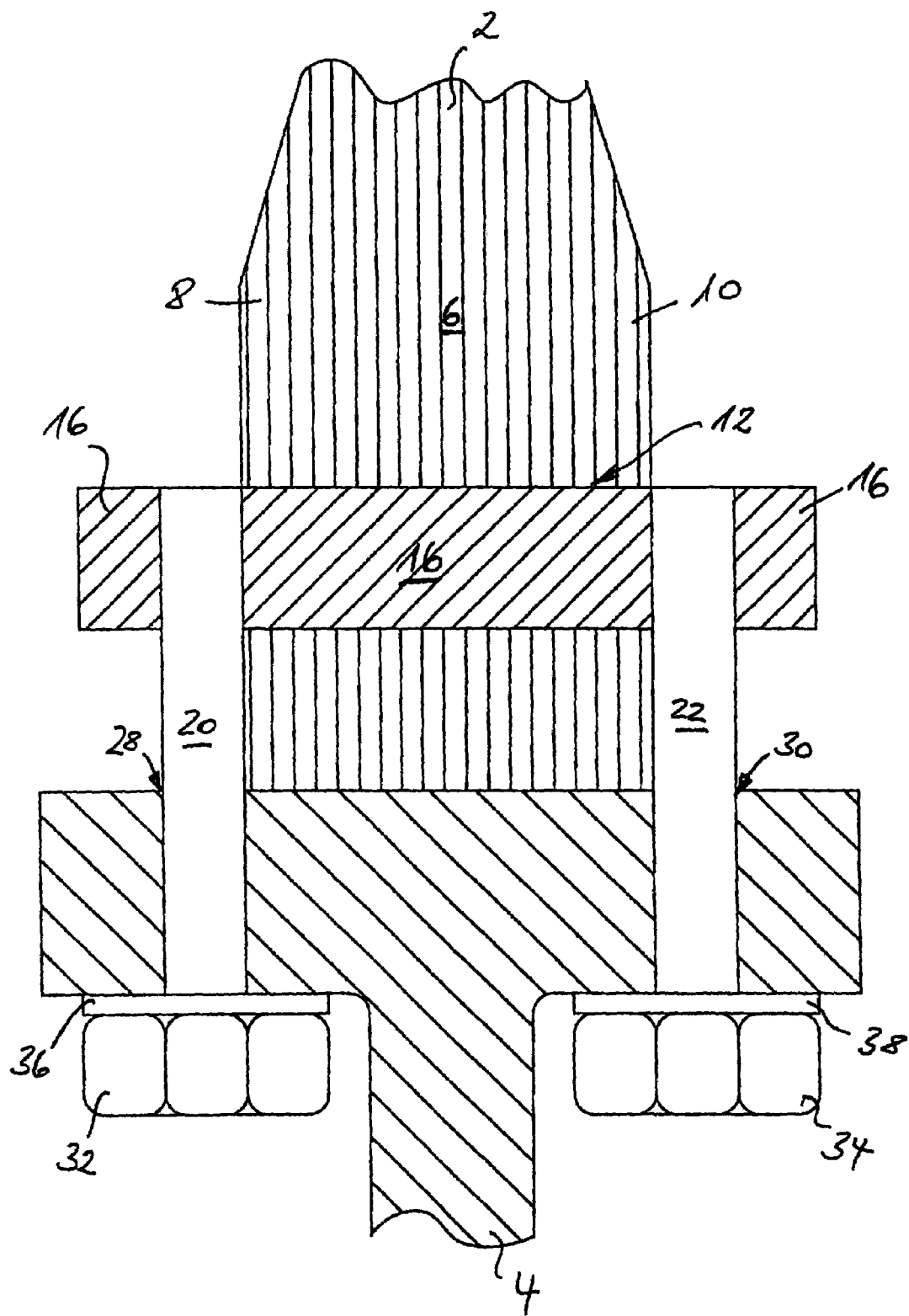
FIG. 4 shows a sectional illustration of an alternative embodiment of the invention.

FIG. 4 shows an alternative simpler embodiment of the invention. In this embodiment the transverse pin 16 extends alone within the hole 12 without a sleeve. It will be appreciated that the transverse pin 16 can again be glued into the hole 12 in order to prevent movement between the two components and thus to prevent abrasion of the material of the rotor blade root 6 and at the same time to hold the transverse pin 16 in its predetermined position during the assembly procedure.

The further structure corresponds to that of the known embodiment: the tension elements 20, 22 extend through the flange and are fixed by means of nuts 32, 34, with the interposition of discs 36, 38.

When implementing the rotor blades in wind power installations, it is particularly advantageous if the wind power installation is such an installation in which the rotor blade is carried by a rotor and the rotor blades can be adjusted in respect of their angle to the wind by means of pitch control. In that case it can also be particularly advantageous if the pitch drive comprises not just one pitch drive but two or three pitch drives.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A rotor blade for a wind power installation comprising:
a rotor blade having a plurality of holes which are arranged in the region of the rotor blade root and which are in the form of through holes which extend substantially transversely with respect to the longitudinal axis of the rotor blade;
transverse pins which are fitted into the holes;
tension elements connected to the transverse pins at locations outside of the rotor blade root.

2. The rotor blade according to claim 1 characterized in that there are provided a plurality of spaced holes for receiving a plurality of transverse pins.

3. The rotor blade according to claim 1 wherein the rotor blade has an enlarged cross-section in the region of the rotor blade root, and at least one of the holes is arranged in the region of the enlarged cross-section.

4. The rotor blade according to claim 3 characterized in that the cross-section of the rotor blade enlarges at both sides in a direction towards an end portion, towards the hub, of the rotor blade.

5. The rotor blade according to claim 1 characterized in that in the region of the rotor blade root the rotor blade has a substantially tubular end portion in which a plurality of holes are provided.

6. The rotor blade according to claim 1 wherein the rotor blade substantially comprises a glass fiber-reinforced epoxy resin composite material.

7. The rotor blade according to claim 1 characterized in that a metallic disc is provided at least one end of one of the holes in concentric relationship with a longitudinal axis of the hole.

8. The rotor for a wind power installation comprising a rotor hub and at least one rotor blade fixed to the rotor hub, characterized in that the at least one rotor blade coupled to the hub is designed in accordance with claim 1.

9. The rotor blade according to claim 8 characterized in that the rotor hub has a peripherally extending flange of substantially T-shaped cross-section for connection of the rotor blade and the rotor blade is screwed to the flange by a plurality of tension elements connected to transverse pins which are arranged in the rotor blade.

10. The rotor according to claim 9 characterized in that the tension elements are arranged in paired parallel relationship with each other and in two substantially mutually concentrically disposed rows.

11. The rotor blade according to claim 1 wherein the tension elements include elongated threaded main bodies, the main bodies have longitudinal axes that are positioned outside of the rotor blade root.

12. The rotor blade according to claim 1 wherein the transverse pins have female screwthread, the tension elements are adjacent to and extend alongside an outer surface of the rotor blade root and engage corresponding female screwthread of the transverse pins.

13. The rotor blade according to claim 1 wherein the tension elements are connected to portions of the transverse pins protruding outwardly from the region of the rotor blade root.

14. A rotor blade for a wind power installation comprising:
a rotor blade having a plurality of holes which are arranged in the region of the rotor blade root and which are in the form of through holes which extend substantially transversely with respect to a longitudinal axis of the rotor blade;
transverse pins which are fitted and glued into the holes; and
tension elements connected to the transverse pins, the transverse pins having a female screwthread and the tension elements have a male screwthread corresponding to the diameter of the female screwthread, the tension elements being screwed into the female screwthread of the transverse pins, and the tension elements extending outside the rotor blade root.

15. A rotor blade for a wind power installation comprising:
a rotor blade having a plurality of holes which are arranged in the region of the rotor blade root and which are in the form of through holes which extend substantially transversely with respect to a longitudinal axis of the rotor blade;
transverse pins which are fitted into the holes;
tension elements connected to the transverse pins, the transverse pins having a female screwthread and the tension elements have a male screwthread corresponding to the diameter of the female screwthread, the tension elements being screwed into the female screwthread of the transverse pins,
the tension elements extending outside the rotor blade root; and
a sleeve in one of the holes, and one of the transverse pins is arranged within the sleeve.

16. An assembly for a wind power installation, the assembly comprising:
a rotor blade including a rotor blade root and a plurality of holes in the rotor blade root, the plurality of holes extending substantially transversely with respect to a longitudinal axis of the rotor blade;

a plurality of transverse pins, the transverse pins extending through respective ones of the holes, sections of the transverse pins are positioned outside the rotor blade root; and a plurality of tension elements connected to the sections of the transverse pins.

17. The assembly of claim 16, further comprising an exterior surface of the rotor blade root positioned between threaded sections of the tension elements and the longitudinal axis of the rotor blade.

* * * * *